US009066247B2

(12) United States Patent
Zhou et al.

(10) Patent No.: US 9,066,247 B2
(45) Date of Patent: Jun. 23, 2015

(54) COMMUNICATION DEVICES AND METHODS FOR SIGNAL DETECTION

(71) Applicant: Intel Mobile Communications GmbH, Neubiberg (DE)

(72) Inventors: Guangxia Zhou, Munich (DE); Wen Xu, Neubiberg (DE); Gerhard Bauch, Munich (DE)

(73) Assignee: INTEL MOBILE COMMUNICATIONS GMBH, Neubiberg (DE)

( * ) Notice: Subject to any disclaimer, the term of this patent is extended or adjusted under 35 U.S.C. 154(b) by 122 days.

(21) Appl. No.: 13/751,267

(22) Filed: Jan. 28, 2013

(65) Prior Publication Data

US 2014/0211831 A1    Jul. 31, 2014

(51) Int. Cl.
H04L 27/06 (2006.01)
H04W 24/02 (2009.01)

(52) U.S. Cl.
CPC ..................... *H04W 24/02* (2013.01)

(58) Field of Classification Search
USPC .......................................................... 375/340
See application file for complete search history.

(56) References Cited

U.S. PATENT DOCUMENTS

| | | | | |
|---|---|---|---|---|
| 8,279,977 B2* | 10/2012 | Rayala | .......................... | 375/316 |
| 2005/0195914 A1* | 9/2005 | Kim et al. | ..................... | 375/267 |
| 2010/0177837 A1* | 7/2010 | Leonidovich et al. | ........ | 375/267 |
| 2010/0329395 A1* | 12/2010 | Kang et al. | .................... | 375/341 |
| 2011/0058632 A1* | 3/2011 | Siti et al. | ........................ | 375/340 |
| 2011/0145671 A1* | 6/2011 | Moon et al. | .................... | 714/748 |
| 2013/0113611 A1* | 5/2013 | Kim et al. | .................. | 340/10.34 |
| 2013/0198838 A1* | 8/2013 | Schmidt et al. | .................. | 726/22 |
| 2013/0279634 A1* | 10/2013 | Andgart et al. | ............... | 375/340 |

OTHER PUBLICATIONS

3rd Generation Partnership Project, Technical Specificiation Group Radio Access Network, "Physical layer aspects for evolved Universal Terrestrial Radio Acesse (UTRA)", Release 7, 3GPP TR 25.814 V7.1.0, Sep. 2006, 132 pages.

Samsung, "CRS interference cancellation in HetNet scenarios for UE performance requirements", Tech. Rep. 1-112507, 3GPP TSG-RAN WG1 Meeting #66, Aug. 22-26, 2011, 3 pages.

Dai et al., "Downlink Capacity of Interference-Limited MIMO Systems with Joint Detection", IEEE Transactions on Wireless Communications, vol. 3, No. 2, Mar. 2004, pp. 442-453.

S. Verdu, "Optimum Multiuser Detection", Cambridge University Press, 1998, pp. 154-165.

Studer et al. "Soft-Output Sphere Decoding: Algorithms and VLSI Implementation", IEEE Journal on Selected Areas in Communications, vol. 26, No. 2, Feb. 2008, pp. 290-300.

(Continued)

*Primary Examiner* — Shuwang Liu
*Assistant Examiner* — Nader Bolourchi (57) ABSTRACT

A communication device is described comprising a receiver configured to receive a receive symbol vector resulting from a transmission of a transmit symbol vector from at least one transmitter to the receiver wherein the transmit symbol vector comprises a plurality of transmit symbols wherein each transmit symbol is associated with a modulation type and a detector configured to determine a detection order for the plurality of transmit symbols based on the modulation types and to determine, for at least one bit of at least one transmit symbol, at least one soft value based on the receive symbol vector according to the detection order.

20 Claims, 10 Drawing Sheets

(56) References Cited

OTHER PUBLICATIONS

Cui et al. "An Efficient Generalized Sphere Decoder for Rank-Deficient MIMO Systems", IEEE Communications Letters, vol. 9, No. 5, May 2005, pp. 423-425.

Wolniansky et al. "V-BLAST: An Architecture for Realizing Very High Data Rates Over the Rich-Scattering Wireless Channel", Sep. 1998, pp. 295-300.

G. J. Foschini et al., "Simplified Processing for High Spectral Efficiency Wireless Communication Employing Multi-Element Arrays," IEEE Journal on Selected Areas in Communications, vol. 17, No. 11, Nov. 1999, pp. 1841-1852.

Ernesto Zimmermann, "Complexity Aspects in Near-Capacity MIMO Detection-Decoding", Ph.D. thesis, 2007, 11 pages.

Hochwald et al., "Achieving Near-Capacity on a Multiple-Antenna Channel", IEEE Transactions on Communications, vol. 51, No. 3, Mar. 2003, pp. 389-399.

Kusume et al. "Cholesky Factorization With Symmetric Permutation Applied to Detecting and Precoding Spatially Multiplexed Data Streams", IEEE Transactions on Signal Processing, vol. 55, No. 6, Jun. 2007, pp. 3089-3103.

Wübben et al., "MMSE Extension of V-BLAST based on Sorted QR Decomposition", Department of Communications Engineering, University of Bremen, Oct. 2003, pp. 508-512.

3rd Generation Partnership Project, Technical Specification Group Radio Access Network "Evolved Universal Terrestrial Radio Access (E-UTRA), Further advancements for E-UTRA physical layer aspects," Release 9, Technical Report, 3GPP TR 36.814 V9.0.0, Mar. 2010, 104 pages.

Zhang et al. "Cochannel Interference Mitigation and Cooperative Processing in Downlink Multicell Multiuser MIMO Networks", EURASIP Journal on Wireless Communications and Networking, Feb. 2004, pp. 222-235.

Barbero et al., "Extending a fixed-complexity sphere decoder to obtain likelihood information for Turbo-MIMO systems," IEEE Transactions on Vehicular Technology, vol. 57, No. 5, Sep. 2008, pp. 2804-2814.

Shen et al., "An adaptive reduced complexity K-best decoding algorithm with early termination," IEEE Electrical Engineering and Computer Science Department, Jan. 2010, 5 pages.

Li et al."An early termination-based improved algorithm for fixed-complexity sphere decoder," IEEE Wireless Communications and Networking Conference, Apr. 2012, pp. 624-629.

I. Kanaras et al., "A fast constrained sphere decoder for ill conditioned communication systems," IEEE Communications Letters, vol. 14, Nov. 2010, pp. 999-1001.

P. Wang et al., "On the expected complexity analysis of a generalized sphere decoding algorithm for underdetermined linear communication systems," in Proc. IEEE ICC, Glasgow, Scotland, Jun. 2007, pp. 2665-2670.

\* cited by examiner

COMMUNICATION DEVICES AND METHODS FOR SIGNAL DETECTION

TECHNICAL FIELD

The present disclosure relates to communication devices and methods for signal detection.

BACKGROUND

In a multi-cell radio communication network with a tight frequency reuse, the performance of a cell-edge users may be severely degraded by inter-cell interference. To improve the performance, an interference-aware receiver is considered in emerging wireless communication standards such as Long Term Evolution (LTE) and LTE-Advanced (LTE-A). An interference-aware receiver can jointly detect both serving and interfering signals in order to generate reliable soft information of the serving signal. Typically, a maximum likelihood (ML) detector can be used in the receiver. This detector resembles a multi-user detector (MUD) for uplink reception at a base station (BS). The MUD can achieve the optimum bit error rate (BER) close to the single-user BER bound. This performance increase usually requires higher computational costs. Hence, a low-complexity ML MUD is desired to improve the performance in an interference-limited scenario.

SUMMARY

A communication device is provided including a receiver configured to receive a receive symbol vector resulting from a transmission of a transmit symbol vector from at least one transmitter to the receiver wherein the transmit symbol vector includes a plurality of transmit symbols wherein each transmit symbol is associated with a modulation type and a detector configured to determine a detection order for the plurality of transmit symbols based on the modulation types and to determine, for at least one bit of at least one transmit symbol, at least one soft value based on the receive symbol vector according to the detection order.

Further, a communication device is provided including a receiver configured to receive a receive symbol vector resulting from a transmission of a transmit symbol vector from at least one transmitter to the receiver wherein the transmit symbol vector includes a plurality of transmit symbols; a first detector configured to determine, for at least one bit of a transmit symbol, a first soft value and a second detector, configured to determine, based on the first soft value, a tree pruning criterion and determine, for at least one bit of a transmit symbol, a second soft value using a tree search based on the tree pruning criterion.

Further, methods for signal detection according to the above communication devices are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
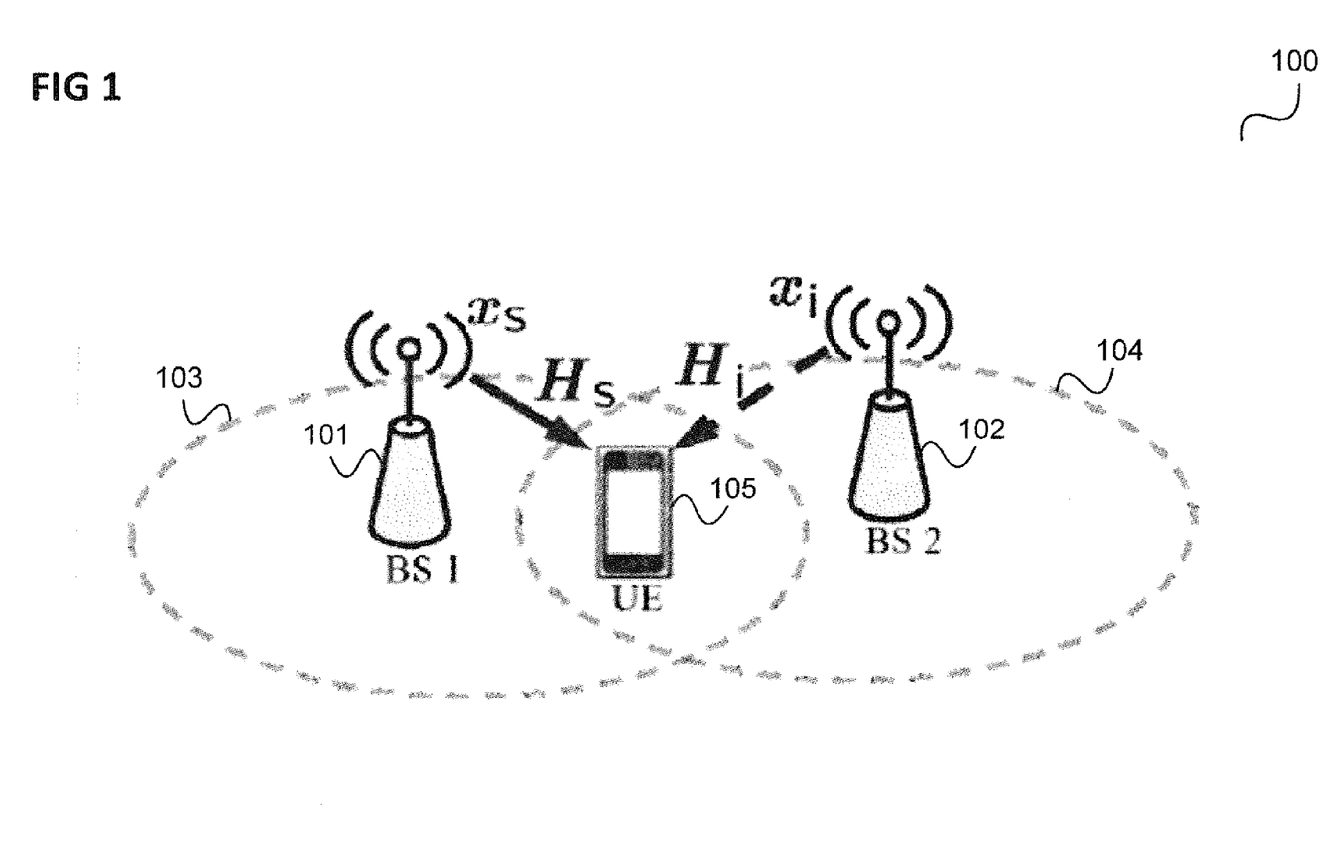
FIG. 1 shows a communication arrangement.

FIG. 1 shows a communication arrangement 100.

The communication arrangement 100 includes a first base station 101 operating a first radio cell 103 and a second base station 102 operation a second radio cell 104. A communication terminal 105 (e.g. a user equipment, UE) is assumed to be located in an overlapping region of the first radio cell 103 and the second radio cell 104.

The communication arrangement 100 implements a single frequency reuse cellular network. The base stations 101, 102 use a multiple-input multiple-output (MIMO) system, e.g. as specified in LTE-A (Long Term Evolution-Advanced), for downlink transmission. Each base station 101, 102 and the user equipment (UE) 105 are equipped with $N_t$ transmit antennas and $N_r$ receive antennas, respectively. The operation of the transmitters of the base stations 101, 102 is illustrated in FIG. 2.

Figure 2:
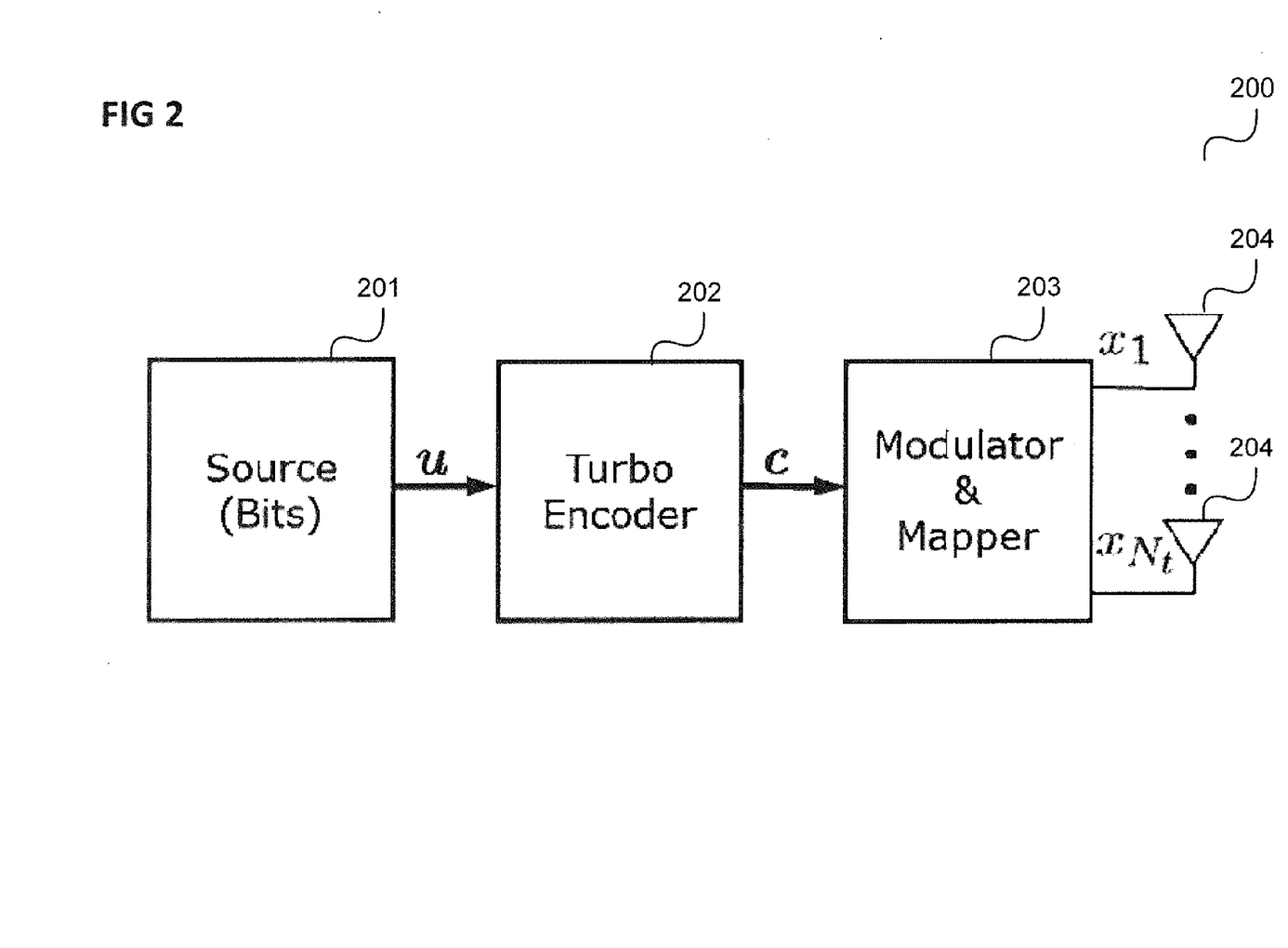
FIG. 2 shows a base station transmitter.

FIG. 2 shows a base station transmitter 200.

The base station transmitter includes a turbo encoder 202 receiving bits to be sent from a data source 201. The turbo encoder codes the bits to be sent to coded bit segments. Each coded bit segmented c is fed to a modulator and mapper 203 which maps a segment of $N_t K$ coded bits c into an $N_t$-dimensional symbol vector $x \in \chi$, where $\chi$ contains the elements chosen from a M-ary QAM set of size $M=2^K$ (i.e. each component of x represents K coded bits). Each of the $N_t$ components of the symbol vector is then sent via one of $N_t$ transmit antennas 204. In the following, the index s is used for the first base station 101 and the index i is used for the second base station (e.g. $\chi_I$ denotes the set of constellation symbols for the second base station 102).

Figure 3:
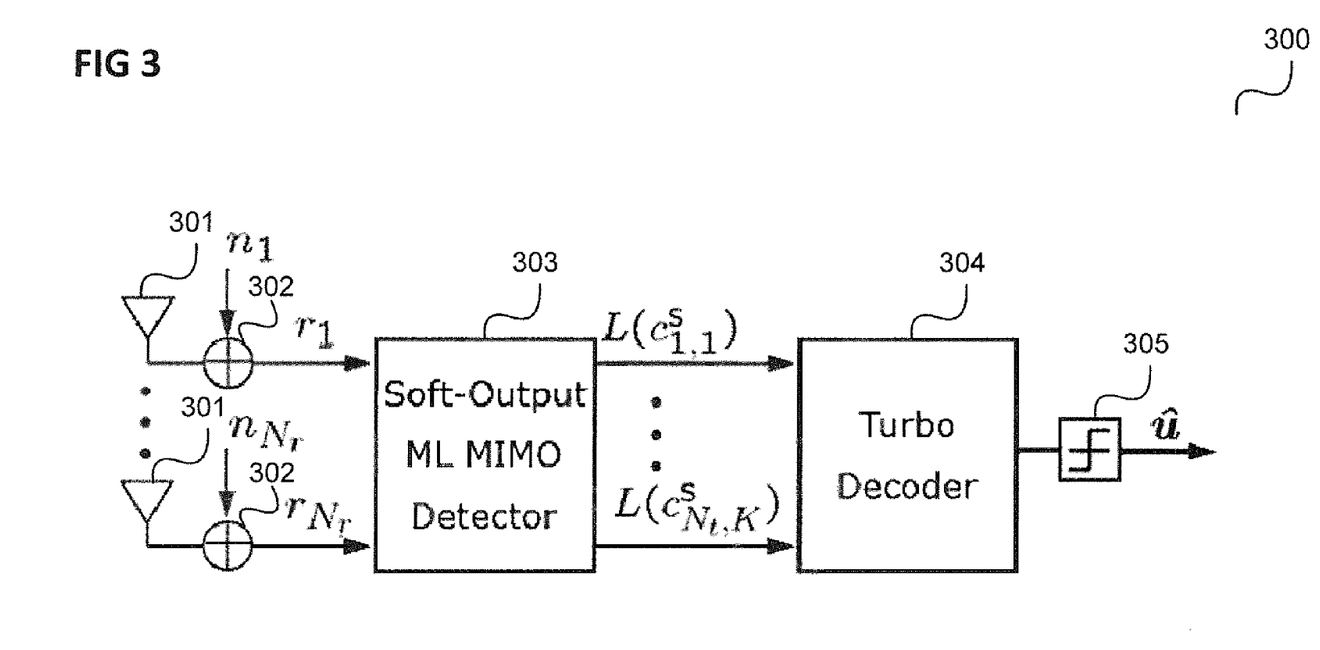
FIG. 3 shows a receiver.

The reception of the signals transmitted by the base stations 101, 102 at the communication terminal 105 is illustrated in FIG. 3.

FIG. 3 shows a receiver 300.

The receiver 300 is for example the receiver of the communication terminal (UE) 105.

There are two signals arriving at the communication terminal 105, $x_s$ and $x_i$, denoting the signals from the first base station 101 (assumed to be the serving base station for the UE 105) and the second base station 102 (assumed to be an interfering base station for the UE 105), respectively. In practice, time and frequency offsets of the signals from different base stations can be determined at an UE, for instance, during cell search. For simplicity, it is assumed that the base stations are time-synchronized, as in the case of 3GPP (Third Generation Partnership Project) time division duplexing LTE (TD-LTE) or synchronous frequency division duplexing LTE (FDD LTE). In this case, the interfering and serving signals at the base station become synchronous and quasi-synchronous such that the received signal at a given subcarrier can be expressed as $$r = H_s x_s + H_i x_i + n, \quad (1)$$

where r is an $N_r$-dimensional vector of received signals including a component for each of $N_r$ receive antennas 301 (received via the respective receive antenna 301), and n is an $N_r$-vector of Gaussian noise samples $n_i \sim \mathcal{CN}(0, \sigma_n^2)$. The addition of the noise is illustrated by an adder 302 for each receive antenna adding the respective noise sample $n_i$ to the received signal component $r_i$.

$x_s \in \chi_s$ and $x_i \in \chi_i$ are the symbol vectors send by the first base station 101 and the second base station 102, respectively, with covariance matrix $\Phi_{xx}^s = \sigma_s^2 I_{N_t}$ and $\Phi_{xx}^i = \sigma_i^2 I_{N_t}$, respectively. The $N_r \times N_t$ Rayleigh fading channel matrices $H_s$ and $H_i$ contain uncorrelated complex gain elements $h_{i,j}^s \sim \mathcal{CN}(0, 1)$ and $h_{i,j}^i \sim \mathcal{CN}(0, 1)$, respectively. The SNR is given by $SNR = \sigma_s^2/\sigma_n^2$ and the signal-to-interference ratio (SIR) by $SIR = \sigma_s^2/\sigma_i^2$.

For the sake of conciseness, the notation of the complex-valued model in Eq. (1) is used, but the following simulations are based on an equivalent real-valued model. In the real-valued model, the complexity is measured by the number of real operations, e.g., addition and multiplication.

The receiver 300 includes a soft-output ML detector 303 configured to generate reliability information in the form of the a posteriori log-likelihood ratio (LLR) for each bit received. The reliability information for a bit is also referred to as the soft value of the bit. Then, a soft-input/soft-output channel decoder 304 and a decider use the LLRs to recover the information bits that have been transmitted.

For single-user ML detector, a number of low-complexity tree search algorithms have been proposed in recent years. The soft-output Schnorr-Euchner sphere decoder (SESD) is viewed as a very attractive algorithm in terms of average complexity. To perform the SESD in an interference-limited scenario, a preprocessing operation may be performed to construct a minimum mean square error (MMSE) metric with a vertical Bell Labs layered space-time (V-BLAST) ordering. This is explained in the following in more detail.

Figure 4:
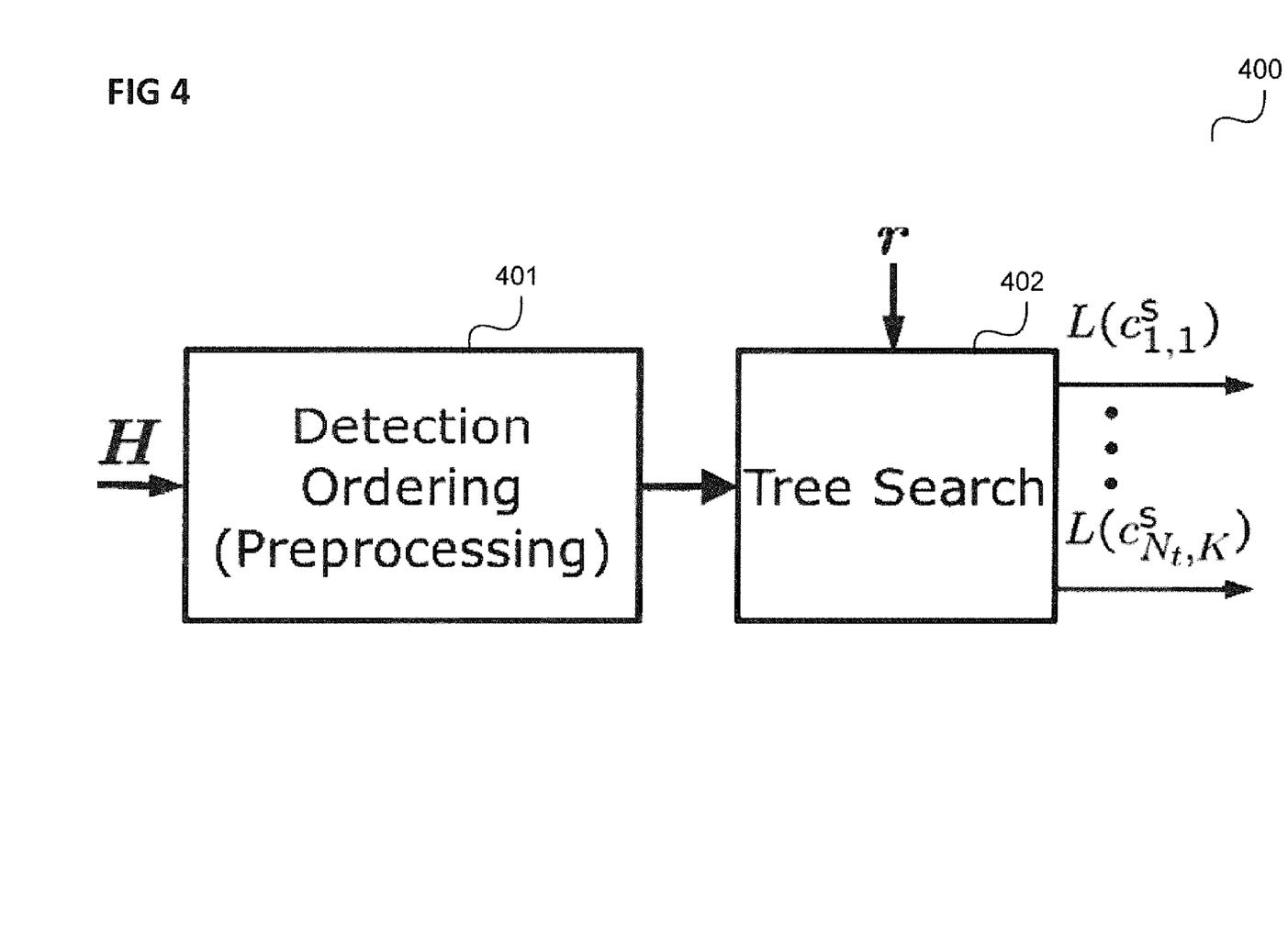
FIG. 4 shows an ML detector.

In order to improve the detection reliability, the LLR for a coded bit $c_{i,j}^s$ in $x_s$ is jointly detected with the interfering signal $x_i$, where $i \in \{1, \ldots, N_t\}$ is the symbol index, and $j \in \{1, \ldots, K_s\}$ is the bit index in the i-th symbol. The LLR $L(c_{i,j}^s | r)$ can be defined as $$L(c_{i,j}^s) = \min_{x_s \in \chi_{i,j}^{s,-1}, x_i \in \chi_i} \Lambda(x) - \min_{x_s \in \chi_{i,j}^{s,+1}, x_i \in \chi_i} \Lambda(x) \quad (2)$$

with $\Lambda(x) = \|\Phi_{nn}^{-1/2}(r - Hx)\|$, where $\Phi_{nn} = \sigma_n^2 I_{N_r}$, $x = [x_s^T x_i^T]^T$ and $H = [H_s H_i]$. $X_{i,j}^{s,\pm1}$ denotes the sets of symbols with corresponding bit $c_{i,j}^s = \pm 1$. As illustrated in FIG. 4 the ML detection problem defined in Eq. (2) may be solved in two steps, namely preprocessing and tree search.

FIG. 4 shows an ML detector 400.

The ML detector 400 includes a preprocessor 401 and a tree searcher 402.

Regarding preprocessing, it should be noted that in general, $H = [H_s H_i]$ is an ill-conditioned matrix (typically, $N_r < 2N_t$). Since it is not feasible to transform the ill-conditioned matrix into a triangular one, the metric in Eq. (2) is modified by adding a constant modulus term $\kappa([(x_s^T x_s)/(\sigma_s^2)] + [(x_i^T x_i)/(\sigma_i^2)])$, and thus the new metric can be expressed as $$\Lambda(x) = (\hat{x} - x)^H \Phi_{\epsilon\epsilon}^{-1} (\hat{x} - x) \quad (3)$$

with $\hat{x} = \Phi_{\epsilon\epsilon} H^H \Phi_{nn}^{-1} r$. $\Phi_{\epsilon\epsilon} = (\kappa \Phi_{\epsilon\epsilon}^{-1} + H^H \Phi_{nn}^{-1} H)^{-1}$ is an error covariance matrix and $\Phi_{xx}$ is the diagonal matrix defined as $$\Phi_{xx} = \begin{bmatrix} \Phi_{xx}^s & 0_{N_t} \\ 0_{N_t} & \Phi_{xx}^i \end{bmatrix}.$$

In this example, $\kappa = 1$, and then $\hat{x}$ becomes an MMSE estimation. $\Lambda(x)$ is the MMSE metric.

Applying a Cholesky factorization with symmetric permutation on $\Phi_{\epsilon\epsilon}^{-1}$: $P^T \Phi_{\epsilon\epsilon}^{-1} P = U^H D U$, where P is a permutation matrix, D a diagonal matrix with non-negative diagonal elements and U a unit upper-triangular matrix, the MMSE metric $\Lambda(x)$ in Eq. (3) can be rewritten as $\Lambda(x) = \|D^{1/2}(y - U x_P)\|^2$ with $y = U P^T \hat{x}$ and $x_P = P^T x$.

The preprocessor 401 may obtain the permutation matrix P by applying an ordering scheme, e.g., V-BLAST ordering. It is well-known that an appropriate ordering can reduce the complexity in the tree search carried out by the tree searcher 402.

In light of the special structure of the upper-triangular matrix U, the LLR calculation may be interpreted as a search for leaf nodes in a tree structure. Then it can be solved efficiently by a tree search algorithm. Generally, different tree search algorithms can be used for this purpose. For example, the tree searcher 402 uses SESD.

The SESD can be used to efficiently find leaf nodes having minimal associated distances. The SESD is based on the depth-first strategy which starts at the root node (layer $2N_t + 1$) of a tree and explores as far as possible along each child node until a leaf node is reached. It then backtracks to upper layers and traverses the tree in a different direction. When leaf nodes are found during the procedure, they may be stored in a set to solve Eq. (2). Based on the LLR clipping, the SESD updates a search radius and prunes the nodes exceeding the radius in a sequential manner (wherein LLRs are calculated based on the distance of leaf nodes to the root in the tree). It can be seen that the SESD effectively reduces the complexity of the max-log ML detection.

The V-BLAST ordering reduces the complexity of the SESD in a single-user ML detector. However, its effect in the interference-limited scenario is not always optimal. This is because the V-BLAST ordering maximizes the post-detection signal-to-noise ratio (SNR) for each layer, instead of minimizing the detection error probability. Under the assumption that all transmitted symbols utilize the same modulation (i.e. are generated using the same type of modulation), the minimal SNR for the first detected symbol dominates the overall error probability. But, in the interference-limited scenario, cell-edge users may often receive the serving and interfering signals with different modulations. In this case, the conventional V-BLAST ordering does not provide a satisfactory solution for complexity reduction, since it does not minimize the detection error probability for different modulations. For example, compared with a higher-order modulation symbol at high SNR, a lower-order modulation symbol at low SNR may have a smaller error probability. Following V-BLAST ordering, the symbol at high SNR is detected first.

Figure 5:
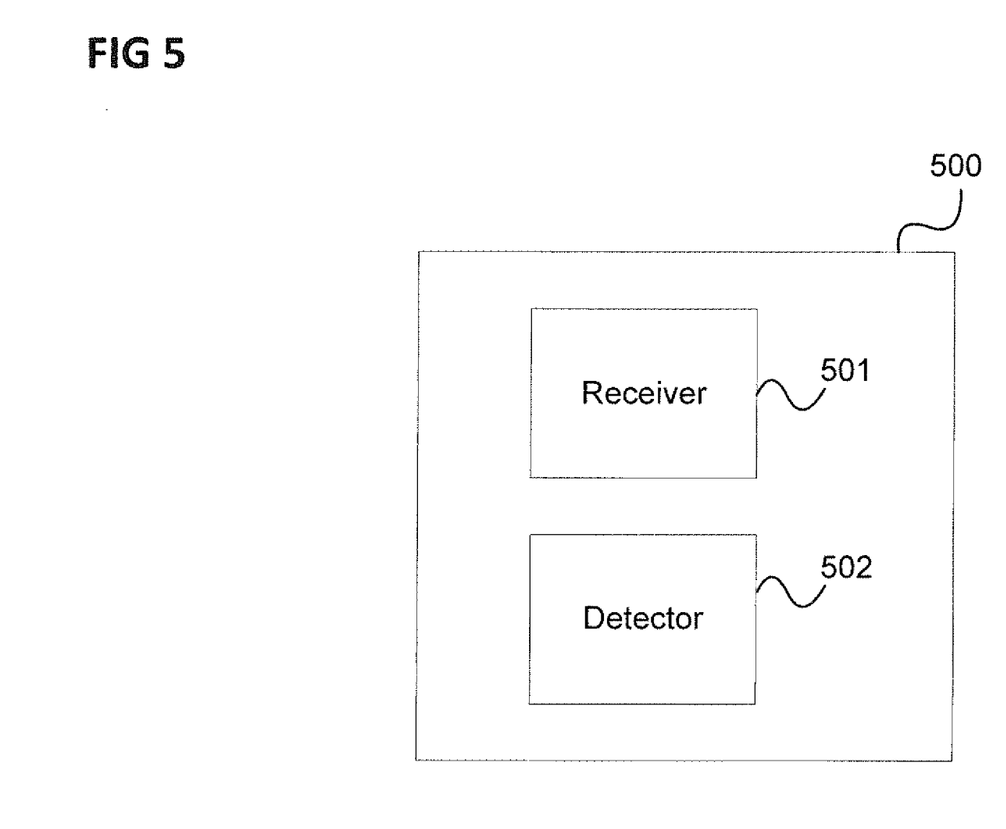
FIG. 5 shows a communication device using detection based on modulation information.

In view of the above, a receiver may be provided as illustrated in FIG. 5. This receiver may for example use a tree search algorithm for detection and can in this case be seen to incorporate modulation information into the tree search ordering (e.g. into the V-BLAST ordering), thus using an ordering scheme to reduce the complexity of the tree search algorithms.

FIG. 5 shows a communication device 500.

The communication device 500 includes a receiver 501 configured to receive a receive symbol vector resulting from a transmission of a transmit symbol vector from at least one transmitter to the receiver wherein the transmit symbol vector includes a plurality of transmit symbols wherein each transmit symbol is associated with a modulation type.

Further, the communication device 500 includes a detector 502 configured to determine a detection order for the plurality of transmit symbols based on the modulation types and to determine, for at least one bit of at least one transmit symbol (e.g. for at least one bit of each transmit symbol), at least one soft value based on the receive symbol vector according to the detection order.

In other words, a receiving communication device (e.g. a communication terminal or a base station) takes into account the type of modulation of a received symbol (i.e. the type of modulation of the transmitted modulation symbol received as the received symbol) when determining an order of the received symbol for detection, e.g. for a tree search.

For example, in an ML detector to jointly detect the serving and interfering signals in an interference-limited scenario, to get a better trade-off between complexity (e.g., in terms of operations) and performance (e.g., in terms of throughput or error rate), the modulation information of the signals is incorporated into the V-BLAST ordering and an corresponding ordering scheme in the preprocessing step is used. This allows a significant complexity reduction when the signals use different modulations. The ordering scheme can be easily applied to any preprocessing operations combined with conventional V-BLAST ordering. In all, the SESD with the ordering scheme can achieve a very good trade-off between performance and complexity and is suitable for practical applications. Moreover, the ordering scheme can be employed to the MUD at a base station, it is applicable not only to LTE inter-cell interference cancellation but also to distributed/cooperative multi-cell MIMO systems at both the base station as well as the terminal (UE) side.

The detector is for example configured to determine, for at least one bit of at least one transmit modulation symbol, a soft value for at least one bit associated with the transmit modulation symbol. In other words, the transmit symbols are for example transmit modulation symbols.

For example, the soft value for the bit associated with the transmit modulation symbol specifies a likelihood or, e.g., a log-likelihood ratio of the bit having a predetermined value.

A bit of a transmit symbol (or transmit modulation symbol) may be seen as a bit associated with the transmit modulation symbol, which is for example a bit on which the transmit (modulation) symbol is based or based on which the transmit (modulation) symbol has been generated.

The detector for example determines the detection order by a bit error probability.

For example, the detector determines the bit error probability by a look-up table.

The detector is for example configured to determine the soft value according to the detection order by performing a tree search according to the detection order.

For example, performing the tree search according to the detection order includes determining candidate modulation symbols for the transmit symbols in the order as given by the detection order.

The modulation type is for example the modulation order (i.e. the number of possible values for the modulation symbol).

The receiver may further be configured to receive modulation information specifying which modulation types are associated with the transmit symbols.

The receive symbol vector for example results from a transmission of the transmission symbols by means of a plurality of transmit signals.

For example, the plurality of transmit signals are transmit signals transmitted from a plurality of different transmitters.

The receive symbol vector for example results from a transmission of a first set of transmission symbols transmitted by a first transmitter and a second set of transmission symbols transmitted by a second transmitter, wherein the first set of transmission symbols is associated with a first modulation type and the second set of transmission symbols is associated with a second modulation type.

The first transmitter is for example a first base station and the second transmitter is for example a second base station.

Alternatively, the first transmitter is for example a first communication terminal and the second transmitter is for example a second communication terminal.

The communication device may include a plurality of receive antennas, the receiver may be configured to receive the receive symbol vector by means of the receive antennas and the receive symbol vector may include a receive symbol for each receive antenna received by means of the receive antenna.

The detector is for example further configured to determine the bits associated with the transmit symbol based on the soft value.

Figure 6:
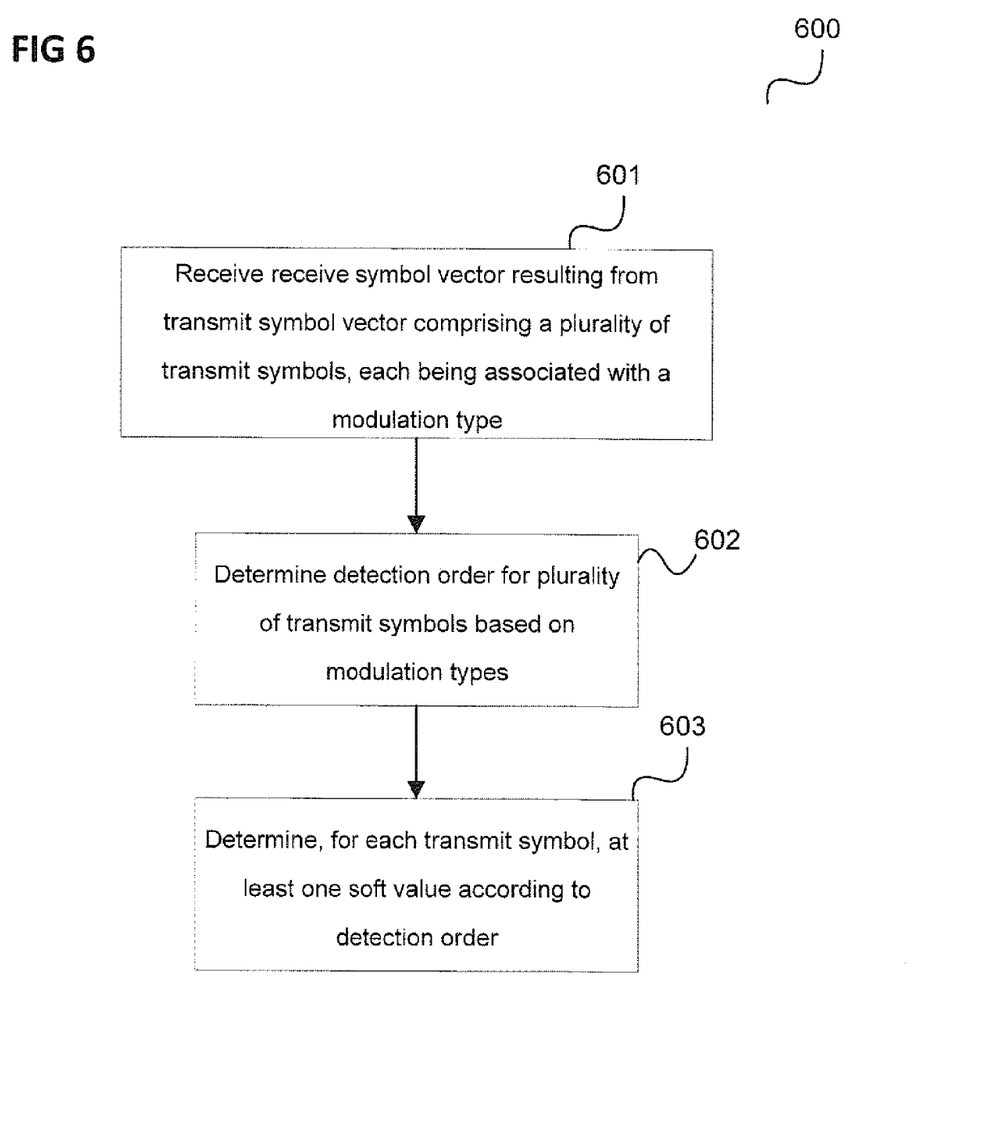
FIG. 6 shows a flow diagram illustrating a signal detection method using detection based on modulation information.

The receiver for example carries out a method as illustrated in FIG. 6.

FIG. 6 shows a flow diagram 600.

The flow diagram 600 illustrates a method for signal detection, e.g. carried out by a communication device.

In 601, the communication device receives a receive symbol vector resulting from a transmission of a transmit symbol vector from at least one transmitter to the receiver wherein the transmit symbol vector includes a plurality of transmit symbols wherein each transmit symbol is associated with a modulation type.

In 602, the communication device determines a detection order for the plurality of transmit symbols based on the modulation types.

In 603, the communication device determines, for at least one bit of at least one transmit symbol, at least one soft value based on the receive symbol vector according to the detection order.

In the following, an example for an ordering scheme performed by the preprocessor 401 of the detector 400 is given as an example of the operation of the communication device 500.

The ordering scheme of the following example can be seen to deal with the case of different modulation symbols.

Considering an additive white Gaussian noise (AWGN) channel, an optimal detection ordering, in terms of bit error probability is given by $$k_i = \underset{k \notin \{k_{i+1}, \ldots, k_{2N_t}\}}{\operatorname{argmin}} P_b(\gamma_k), \quad (4)$$

with a decreasing sequence $i \in \{2N_t, \ldots, 1\}$, where $\gamma_k$ denotes the post-detection signal-to-interference-plus-noise ratio (SINR) for layer k. Thereby the detection order is $\mathcal{K} = \{k_{2N_t}, \ldots, k_1\}$. $P_b(\gamma)$ is the bit error probability as a function of $\gamma$. For M-ary QAM, it holds $$P_b(\gamma_k) \approx \frac{\sqrt{M}-1}{\sqrt{M} \cdot K} erfc\left(\sqrt{\frac{3\gamma_k}{2(M_k-1)}}\right), \quad (5)$$

where erfc(t) is the complementary error function. By substituting Eq. (5) into Eq. (4), the scheme according to the following equation (6) can be obtained which can be seen to incorporate the modulation information (i.e. the information about the order of the modulation, or the number of possible modulation symbols) into the V-BLAST ordering $$k_i = \underset{k \notin \{k_{i+1}, \ldots, k_{2N_t}\}}{\operatorname{argmin}} \exp\left(\frac{\sqrt{M_k}-1}{\sqrt{M_k} \cdot K_k} erfc\left(\sqrt{\frac{3\gamma_k}{2(M_k-1)}}\right)\right). \quad (6)$$

Since the erfc(t) decays exponentially with t, the ordering based on the erfc(t) may not be accurate in fixed-point implementation, especially for large t. Thus, exp(erfc(t)) is used instead in this example. In practical implementation, a lookup table can be used to store the values of exp(erfc(t)).

However, extra computationally expensive operations, i.e., square root and exponential functions, are required in Eq. (6). To reduce the complexity, a simplified improved ordering may be used as follows. It can be shown that the $P_b(\gamma)$ in Eq. (5) is upper bounded by $$\frac{1}{2}\exp\left(\frac{-3\gamma}{2(M-1)}\right).$$

Asymptote $P_b(\gamma)$ decays exponentially with $$\frac{-3\gamma}{2(M-1)},$$

implying that the detection order relies on $$\frac{\gamma}{M-1}.$$

Accordingly, a simplified improved ordering can be defined as $$k_i = \underset{k \notin \{k_{i+1}, \ldots, k_{2N_t}\}}{\operatorname{argmin}} \frac{\gamma_k}{M_k-1}, \quad (7)$$

where $M_k$ denotes the modulation order of the k-th symbol.

It should be noted that if all symbols use the same modulation, the ordering according to Eq. (7) is the same as the V-BLAST ordering, namely according to $\gamma_k$.

The detection ordering schemes according to Eq. (6) and Eq. (7) can be applied to any preprocessing operation with V-BLAST ordering, e.g., Cholesky factorization with symmetric permutation and sorted-QR decomposition. In the following example, Cholesky factorization is used as it can avoid performing computationally expensive square root operations, compared with the QR decomposition. Algorithm 1 as follows corresponds to a Cholesky factorization combined with the detection ordering according to Eqs. (6) and (7).

---

Algorithm 1: Cholesky factorization with ordering

---

Input $\Phi_{\epsilon\epsilon}$
Output: D, U, P
1   P := I, D' := $0_{N_t}$;
2   for i = $2N_t$ to 1 do
3   $\quad$ $k_i$ = arg $\min_{k=i,\ldots,l} \Phi_{\epsilon\epsilon}(k,k) \cdot (M_k - 1)$;
4   $\quad$ exchange columns i and $k_i$ in P;
5   $\quad$ exchange rows i and $k_i$ in $\Phi_{\epsilon\epsilon}$;
6   $\quad$ exchange columns i and $k_i$ in $\Phi_{\epsilon\epsilon}$;
7   $\quad$ D'(i,i) = $\Phi_{\epsilon\epsilon}$(i,i);
8   $\quad$ $\Phi_{\epsilon\epsilon}$(1 : i,i) = $\Phi_{\epsilon\epsilon}$(1 : i,i)/D'(i,i);
9   $\quad$ for j = 1 to i − 1 do
10  $\quad\quad$ $\Phi_{\epsilon\epsilon}$(1 : j,j) = $\Phi_{\epsilon\epsilon}$(1 : j,j)
         $-\Phi_{\epsilon\epsilon}$(1 : j,i)$\Phi_{\epsilon\epsilon}$*(j,i)D'(i,i);
11  $\quad\quad$
12  $\quad\quad$ $\Phi_{\epsilon\epsilon}$(j,1 : j) = $\Phi_{\epsilon\epsilon}$(1 : j,j)$^H$;
13  $\quad$ end
14  end
15  U' := upper triangular of $\Phi_{\epsilon\epsilon}$;
16  U := U'$^{-1}$, D := D'$^{-1}$;

---

Algorithm 1 mainly follows an optimum ordered Cholesky factorization. However, the ordering is determined by the minimum of products of the diagonal elements $\Phi_{\epsilon\epsilon}$(k,k) and the corresponding $M_k-1$, instead of the minimum of the diagonal elements $\Phi_{\epsilon\epsilon}$(k,k). The diagonal elements $\Phi_{\epsilon\epsilon}$(k,k) of $\Phi_{\epsilon\epsilon}$ are inversely proportional to the post-detection SINRs, thus minimizing $\Phi_{\epsilon\epsilon}$(k,k)·($M_k-1$) is equivalent to maximizing $$\frac{\gamma_k}{M_k-1}$$

in Eq. (7).

The above example can be seen as an improved V-BLAST ordering scheme incorporating the modulation information into bit error probability based V-BLAST ordering, the bit error probability defined by the bit error probability of M-QAM over AWGN channel.

According to Eq. (7), a simplified improved V-BLAST ordering scheme may be used incorporating the modulation information into standard V-BLAST ordering.

The tree searcher 402 may, in addition or independently of the above ordering scheme based on modulation information use a soft symbol based tree pruning method for the SESD which allows reducing complexity without losing much performance. The soft tree pruning method uses reliability information on bits to estimate the search radius before the tree search. Accordingly, the basic architecture of the SESD may be kept unchanged. A general example for a tree pruning scheme that may be provided is described in the following with reference to FIG. 7.

Figure 7:
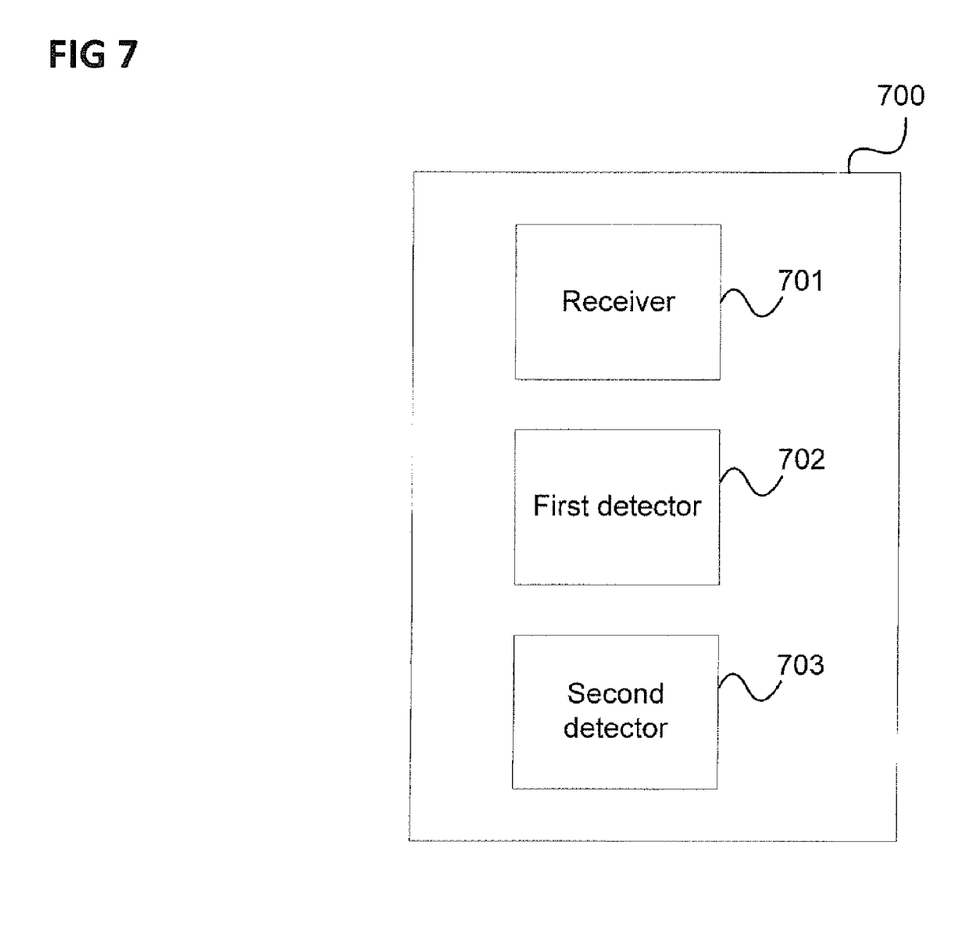
FIG. 7 shows a communication device using a tree pruning method.

FIG. 7 shows a communication device 700

The communication device 700 includes a receiver 701 configured to receive a receive symbol vector resulting from a transmission of a transmit symbol vector from at least one transmitter to the receiver wherein the transmit symbol vector includes a plurality of transmit symbols.

The communication device 700 further includes a first detector 701 configured to determine, for at least one bit associated with a transmit symbol, a first soft value and a second detector 702 configured to determine, based on the first soft value, a tree pruning criterion and determine, for at least one bit associated with a transmit symbol, a second soft value using a tree search based on the tree pruning criterion.

For example, the detector is configured to determine, for each transmit symbol, for at least one bit associated with the transmit symbol, a first soft value and the second detector is configured to determine, based on the first soft value, the tree pruning criterion.

In other words, the depth of a tree search carried out by a detector is determined based on a preliminary estimate of a received symbol vector, i.e. the tree is pruned based on the preliminary estimate.

This approach (which can be seen as soft tree pruning method) may be used in both breadth-first and depth first tree search algorithms. In a depth-first tree algorithm, e.g., SESD, the initial search radius is determined instead of the arbitrarily large value. In a breadth-first tree search algorithm, e.g., FSD, the approach can be used for fully parallel mode. Although extra computational operations may be required in the initial stage the overall complexity may be significantly reduced in terms of the average and worst-case complexities, compared with the conventional SESD. Compared with the conventional FSD, it has better performance with only a slightly increased worst-case complexity.

The first detector is for example a linear MMSE detector.

Determining the tree pruning criterion for example includes determining a threshold and the tree pruning criterion for example includes excluding all tree nodes having a (e.g. MMSE) metric above the threshold from the tree search.

For example, the second detector is configured to determine the threshold as the sum of a (e.g. MMSE) metric of an estimate of the transmit symbols and a predetermined value.

For example, the first detector is configured to determine, for each transmit symbol, for at least one bit of a transmit symbol, a first soft value and the second detector is configured to determine the metric of an estimate of the transmit symbols based on the first soft values.

The second detector may further be configured to determine the bits associated with the transmit symbol based on the second soft value (e.g. determine the transmit symbols based on second soft values determined for all transmit symbols).

Figure 8:
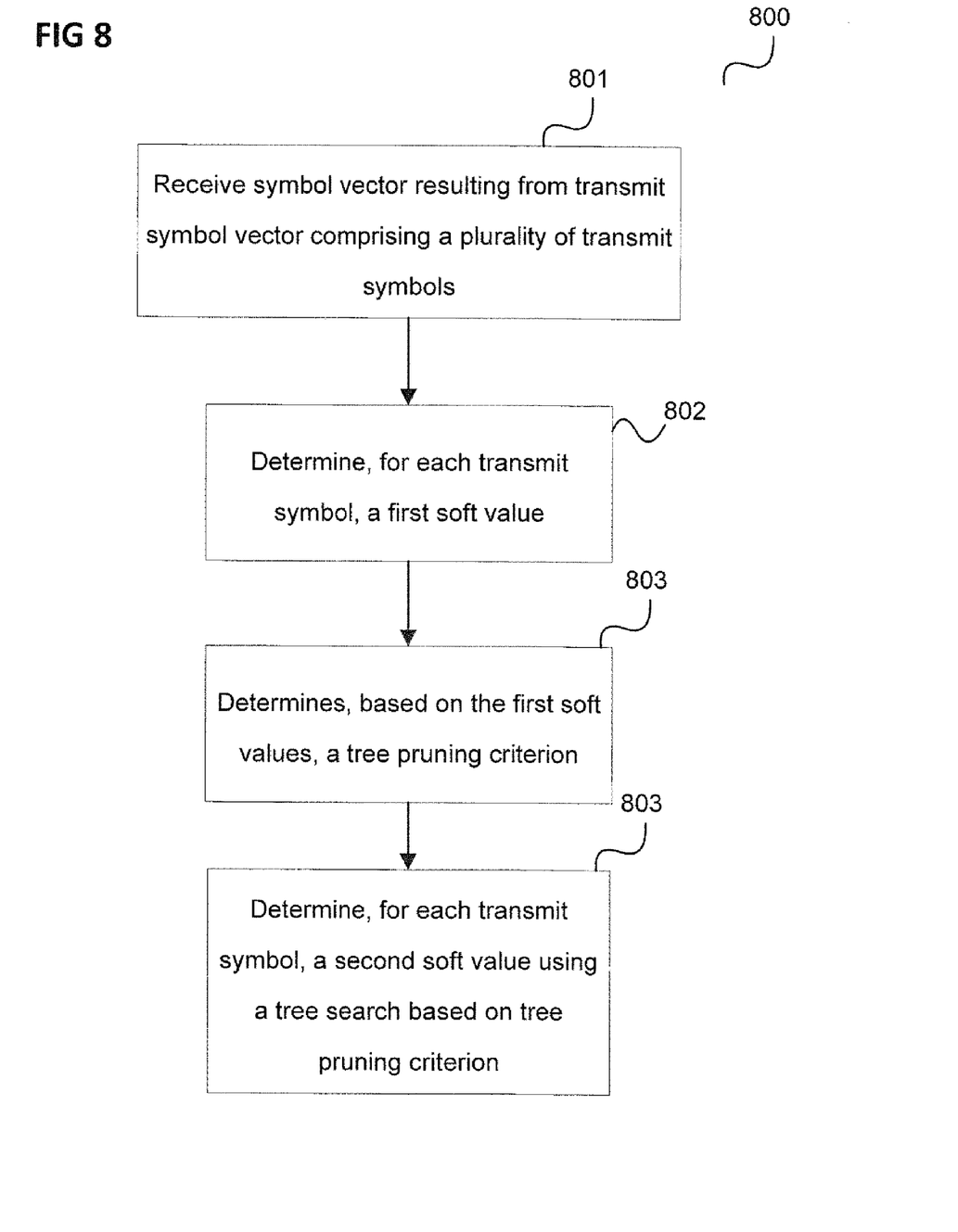
FIG. 8 shows a flow diagram illustrating a signal detection method using a tree pruning method.

The receiver 700 for example carries out a method as illustrated in FIG. 8.

FIG. 8 shows a flow diagram 800.

The flow diagram 800 illustrates a method for signal detection, e.g. carried out by a communication device.

In 801, the communication device receives a receive symbol vector resulting from a transmission of a transmit symbol vector from at least one transmitter to the receiver wherein the transmit symbol vector includes a plurality of transmit symbols.

In 802, the communication device determines, for at least one bit of the transmit symbol, a first soft value.

In 803, the communication device determines, based on the first soft value, a tree pruning criterion (also referred to as soft tree pruning criterion in the following).

In 804, the communication device determines, for at least one bit of the transmit symbol, a second soft value using a tree search based on the tree pruning criterion.

The components of the devices 300, 500, 700 (e.g. the determiner, the detectors etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

It should be noted that aspects and examples described in context of one of the communication devices 500, 700 are analogously valid for the other communication device and the methods for signal detection and vice versa. For example, functionalities of the communication devices 500, 700 may be combined.

In the following, an example for tree pruning scheme performed by the tree searcher 402 of the detector 400 is given as an example of the operation of the receiver 700.

In course of the tree search, the tree searcher 402 may perform LLR clipping and, if the LLR of a given bit is larger than a threshold $L_{clip}$, replace it by $L_{clip}$ and through away the corresponding counter hypothesis. Then the tree searcher 402 (e.g. operating as SESD) may prune nodes of the search tree with the current ML distance plus $L_{clip}$ as search radius to reduce complexity dynamically. The search radius $\gamma$ is less than or equal to the ML distance plus L clip: $\gamma \leq \Lambda(x^{ML}) + L_{clip}$.

The search radius may be initialized to an arbitrarily large value and then tightened during the tree search. In order to avoid extra computations, the ML distance may be estimated before the tree search. Accordingly, the whole detection procedure may include two steps. In the first step, a linear MMSE filter is performed to separate the serving and interfering signals. By relaxing the finite modulation constraint and making the Gaussian assumption, the ML distance can be estimated by the linear MMSE estimation, instead of the ML estimation. The ML distance is thus given by $$\Lambda(x^{LMMSE}) = \|D^{1/2}(y - U\bar{x}^{LMMSE})\|, \qquad (8)$$

where $\bar{x} = E[x]$ and $x^{LMMSE}$ denotes the linear MMSE estimation. The $\bar{x}_i$ is the soft symbol which can be obtained using the LLRs provided by the linear MMSE filter $$\bar{x}_i = \sum_{x \in Q} x \prod_{j=1}^{K_i} \frac{1}{2}\left(1 + c_j \tanh\left(\frac{L(c_j)}{2}\right)\right) \qquad (9)$$

where Q is the set of possible modulation symbols and with $c_j$ denoting the value of the j-th bit in the bit vector corresponding to the modulated symbol x of the signal set. In short, the soft tree pruning criterion is in this example defined as $$\gamma = \Lambda(x^{LMMSE}) + L_{clip}. \qquad (10)$$

In the second step, the tree searcher 402 uses the soft tree pruning criterion according to (10) for the SESD. For example, the search radius generated by the linear MMSE filter in the first step is used instead of an arbitrarily large value.

The soft tree pruning criterion may be used for a breadth-first tree search algorithms, e.g. a fixed-complexity sphere decoder (FSD) which is used in the following example. The FSD has been proposed to approach the optimal performance with fixed complexity. Strictly speaking, the FSD is not a sphere decoder but rather a smart enumeration method. Based on predefined parameters, the FSD enumerates and keeps a certain number of child nodes from each retained node layer-by-layer until leaf nodes are reached. The FSD is suitable for a fully pipelined architecture, but it cannot guarantee finding the leaf nodes with the smallest distances. In order to minimize the performance penalty, the number of child nodes to be enumerated per node at each layer should be chosen sufficiently large. This leads to a higher complexity (on average) than the SESD.

The FSD enumerates all retained nodes no matter how large their distances are. Pruning the unpromising nodes in the early stage of the tree search can reduce the complexity, especially for large MIMO systems. However, this is not a straightforward method for the FSD, because it is difficult to determine the ML distance during the process of the tree search. The principal difference between the breadth-first strategy and the depth-first strategy leads to this issue. The breadth-first FSD visits nodes layer-by-layer, rather than reaching a leaf node first before backtracking in the depth-first strategy. Thus, leaf nodes cannot be got until we reach the last layer. In other words, the ML node's distance is unknown during the search. Due to the difficulty of determining the search radius, the FSD enumerates and keeps all retained nodes in each layer, though some nodes are not worthy to be extended due to their extremely large distances. This leads to many redundant computations.

In order to avoid these extra computations, the tree searcher 402 may use the soft tree pruning method as described above to prune the tree in the FSD. For a given layer i+1, the radius $\gamma$ defined in Eq. (10) is used to check every node in the set $L_{i+1}$, and eliminate from $L_{i+1}$ the nodes which exceed $\gamma$. Thus, a new set $L'_{i+1}$ is generated. In the next layer i, similar as the original FSD, the $b_i$ best child nodes are enumerated from each node in this checked set $L'_{i+1}$. A pseudo code description of this tree pruning based FSD is provided in Algorithm 2.

---

Algorithm 2: Tree Pruning based FSD

---

Input: x, U, D, b, $\Lambda(x^{LMMSE})$, $L_{clip}$
Output: L
1   $L_{2N_t+1}$ := root node;
2   for i = $2N_t$ to 1 do
3       for j = 1 to $|L_{i+1}|$ do
4          $\Lambda_j(x_j^{(i+1)})$ := distance of node $x_j^{(i+1)} \in L_{i+1}$;
5          if $\Lambda_j(x_j^{(i+1)}) \leq \Lambda(x^{LMMSE}) + L_{clip}$ then
6             $L'_{i+1} = L'_{i+1} \cup x_j^{(i+1)}$;
7          end
8       end
9       $L_i := \cup_{node \in L'_{i+1}} \{b_i \text{ best child nodes of node}\}$;
10  end
11  L = $L_1$;

---

Algorithm 2 can be seen to mainly follow the FSD. However, each node is checked by the tree pruning criterion in the loop of Line 3.

According to the soft tree pruning method reliability information on bits is utilized to estimate the search radius before the tree search. This is for example in contrast to a so-called modified FSD which divides the tree into several sub-trees and updates the search radius in a sequential manner at the end of each sub-tree search. Furthermore, the soft tree pruning method does not change the architecture of the FSD, so it still works in a fully parallel mode instead of requiring an extra sequential tree search which leads to a partially parallel mode as according to modified FSD.

In the following, the results of Monte-Carlo simulations for evaluating the performance in an LTE-A framework are given.

The simulation parameters follow the evaluation methodology in LTE-A. It is assumed that there are two transmit antennas at both base stations 101, 102 and two receive antennas at the UE 105. The base stations 101, 102 are assumed to be time-synchronized. The channel model is the low-correlated 3GPP Extended Vehicular A model with 5 Mhz bandwidth and perfect channel state information is assumed to be known at UE 105. The transmit signals are modulated using Gray-mapped M-ary QAM (M$\in\{4,16,64\}$). For the channel coding, the LTE turbo code with a rate ½ is used and eight internal iterations are performed in the turbo decoder. A non-iterative detection-decoding scheme is used in the receiver, which means that both detector and decoder run only once.

The soft-output SESD with the following four ordering schemes is applied to jointly detect the signals: random, conventional V-BLAST, improved V-BLAST according to Eq. (6) and simplified improved V-BLAST according to Eq. (7). It can be shown that changing the detection order does not affect the performance given that the complexity is not limited. In the following, the focus is on the complexity of the SESD variants. As a figure of merit, the number of operations necessary to perform the SESD is chosen. The operations include addition, subtraction, multiplication and logical comparison. For simplicity, all the operations are assumed to have the same number of cycles.

The complexity of the SESD consists of two parts: the complexity of node computations and the complexity of node comparisons. The theoretic complexity of a node computation can be formulated by equations listed in the following table.

| Num. of Additions/Subtractions | Num. of Multiplications |
|---|---|
| $4N_t - i + 2$ | $4N_t - i + 2$ |

* $i \in \{4N_t, \ldots, 1\}$ denotes the layer index.

Each node comparison costs at most 1+NtKs logical comparisons. Since the SESD is based on a depth-first search strategy, both the number of node computations and the number of node comparisons change from case to case. This leads to a variable overall complexity. Thus, the overall complexity here is measured by the Monte-Carlo simulation, and is evaluated in terms of the average and the worst-case complexities.

Figure 9:
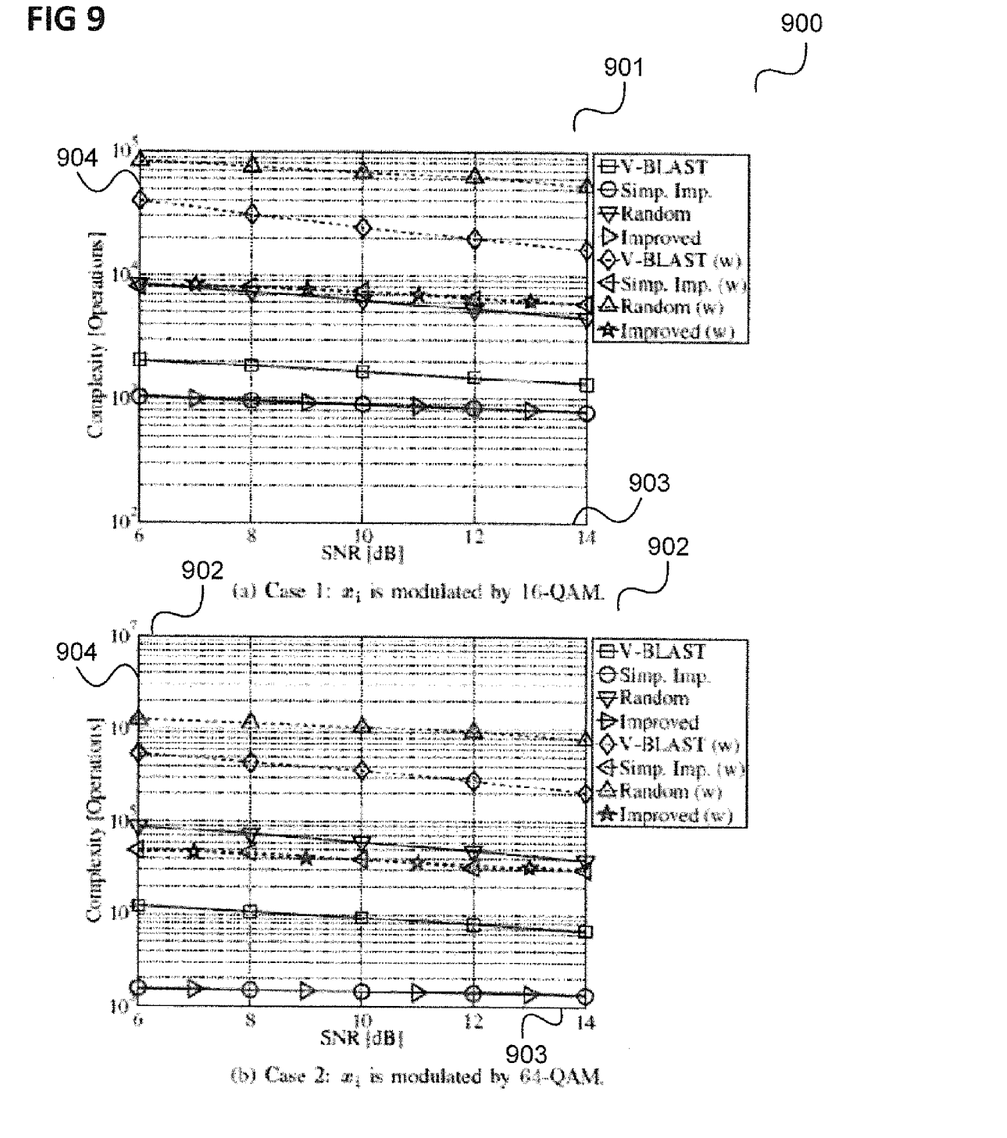
FIG. 9 depicts the average and the worst-case complexities in the case of 16-QAM interfering signals and 64-QAM interfering signals for various detection methods.

FIG. 9 depicts the average and the worst-case complexities in the case of 16-QAM interfering signals in a first diagram 901 and 64-QAM interfering signals in a second diagram 902. In the diagrams 901, 902, SNR increases from left to right along SNR axes 903 and complexity (in number of operations) increases from bottom to top along complexity axes 904.

It can be seen that the conventional V-BLAST ordering is superior to the random one, but it still leads to a higher complexity of the SESD than the improved V-BLAST, because it does not take the modulation information into account. Compared with the conventional ordering, the improved ordering reduces the average complexity by 43% and the worst-case complexity by 65% at SNR=12 dB and the coded block error rate (BLER) region of interest (BLER=0.1) in the case of a relatively lower-order modulation interfering signal, i.e., $\chi_i$ is the set of 16-QAM constellation symbols. In the case of a relatively higher-order modulation, i.e., $\chi_i$ is the set of 64-QAM constellation symbols, the improved ordering can reduce the average complexity by 80% and the worst-case complexity by 87% at SNR=13 dB and BLER=0.1. It is worth to note that the simplified improved ordering can achieve almost the same complexity as the improved ordering in the tree search step. It also requires much less operations than the improved one in the preprocessing step. In summary, the complexity reduction with the simplified improved V-BLAST ordering becomes significant when signals use different modulations, especially the interfering signal has a higher-order modulation.

In the following, the SESD with upper bounded complexity is considered. The tree search is stopped after a maximum of Nm node computations, as the complexity is dominated by the number of node computations.

Figure 10:
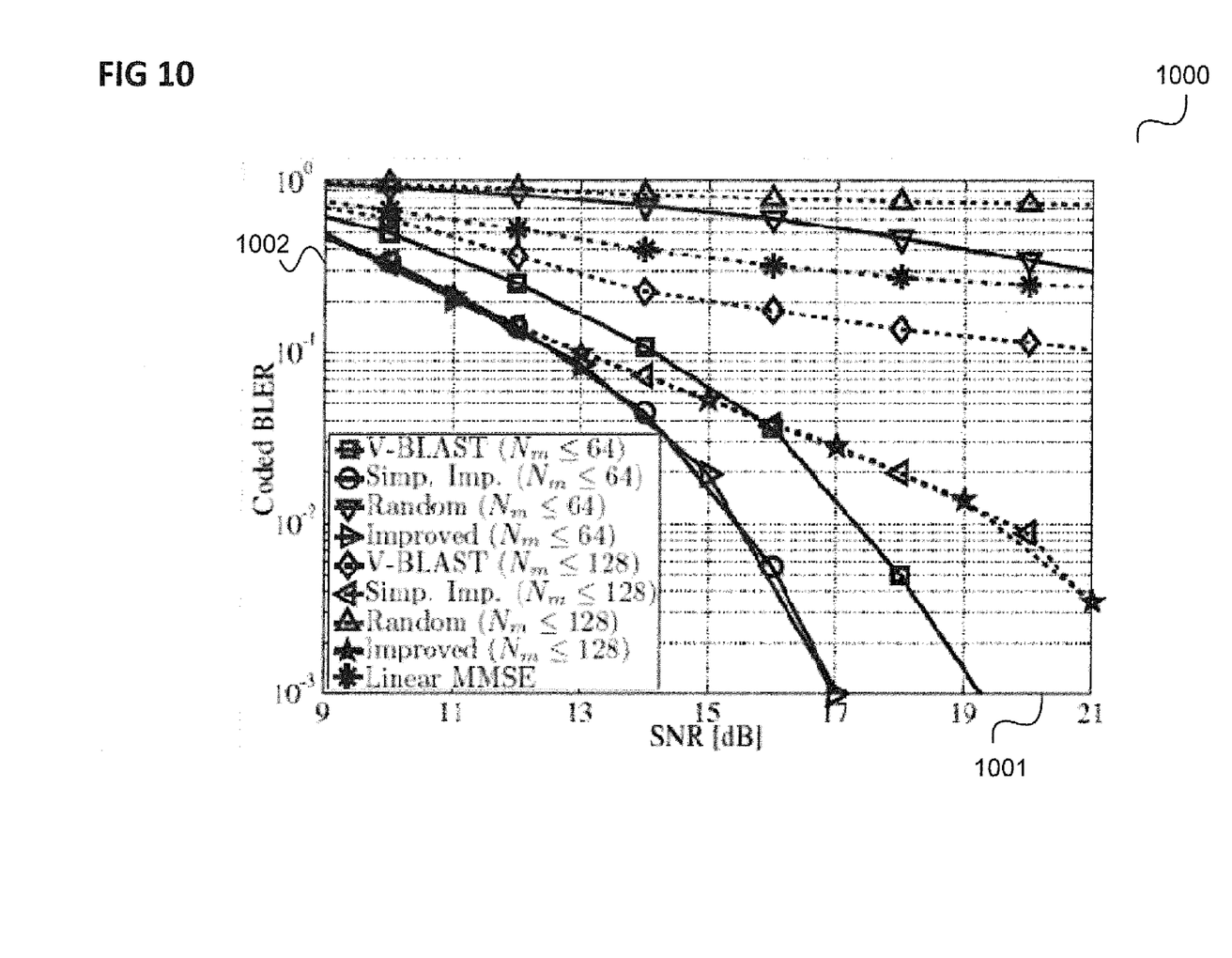
FIG. 10 shows a diagram with a plot of the coded BLER of the serving signal for various detection methods.

FIG. 10 shows a diagram 1000 with a plot of the coded BLER of the serving signal. In the diagram 1000 SNR increases from left to right along an SNR axes 1001 and BLER increases from bottom to top along a BLER axis 1002. The diagram 1000 illustrates Coded BLER performance of the SESD with random, conventional V-BLAST, improved V-BLAST and simplified improved V-BLAST ordering. $x_s$ is modulated by 4-QAM. Solid curves indicate 16-QAM and dashed curves indicate 64-QAM. SIR=3 dB.

A linear MMSE filter is plotted as a benchmark. As the lower-order modulated signal can be more easily exploited, the case of 16-QAM is better than that of 64-QAM, even the maximum node computation in the former case is only half of the latter case. It can be seen that the performance of the SESD with random ordering is worse than that of the linear MMSE filter, since the prematurely stopped tree search can no longer find appropriate leaf nodes. With smart ordering, the performance can be significantly improved. Both the simplified improved ordering and the improved ordering provide better performance than the conventional ordering. In the coded BLER region of interest (BLER=0.1), they provide a 1.5 dB gain compared with the conventional one, as the interfering signal is modulated by 16-QAM. As the interfering signal is modulated by 64-QAM, the gain becomes 8 dB. Considering the much lower complexity requirement of the simplified improved ordering in the preprocessing step, the simplified improved ordering can be seen to have the best compromise among the investigated schemes.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication device comprising:
   a receiver configured to receive a symbol vector resulting from a transmission of a transmit symbol vector from at least one transmitter to the receiver wherein the transmit symbol vector comprises a plurality of transmit symbols;
   a first detector configured to determine, for at least one bit of a transmit symbol, a first soft value;
   a second detector, configured to determine, based on the first soft value, a tree pruning criterion and determine, for at least one bit of a transmit symbol, a second soft value using a tree search based on the tree pruning criterion.

2. The communication device according to claim 1, wherein the first detector is a linear MMSE detector.

3. The communication device according to claim 1, wherein determining the tree pruning criterion includes determining a threshold and wherein the tree pruning criterion includes excluding all tree nodes having a metric above the threshold from the tree search.

4. The communication device according to claim 3, wherein the second detector is configured to determine the threshold as the sum of a metric of an estimate of the transmit symbols and a predetermined value.

5. The communication device according to claim 4, wherein the first detector is configured to determine, for each transmit symbol, for at least one bit of the transmit symbol, a first soft value and wherein the second detector is configured to determine the metric of an estimate of the transmit symbols based on the first soft value.

6. The communication device according to claim 1, wherein the second detector is further configured to determine the bits associated with the transmit symbol based on the second soft value.

7. The communication device according to claim 1, wherein the receive symbol vector results from a transmission of the transmission symbols by means of a plurality of transmit signals.

8. The communication device according to claim 7, wherein the plurality of transmit signals are transmit signals transmitted from a plurality of different transmitters.

9. The communication device according to claim 1, wherein the receive symbol vector results from a transmission of a first set of transmission symbols transmitted by a first transmitter and a second set of transmit symbols transmitted by a second transmitter.

10. The communication device according to claim 9, wherein the first transmitter is a first base station and the second transmitter is a second base station.

11. The communication device according to claim 9, wherein the first transmitter is a first communication
   terminal and the second transmitter is a second communication terminal.

12. The communication device according to claim 1, wherein the communication device comprises a plurality of receive antennas, the receiver is configured to receive the receive symbol vector by means of the receive antennas, and the receive symbol vector comprises a receive symbol for each receive antenna received by means of the receive antenna.

13. The communication device according to claim 1, wherein the receiver is further configured to receive modulation information specifying which modulation types are associated with the transmit symbols.

14. A method for signal detection comprising:
   receiving a receive symbol vector resulting from a transmission of a transmit symbol vector from at least one transmitter to the receiver wherein the transmit symbol vector comprises a plurality of transmit symbols;
   determining, for at least one bit of a transmit symbol, a first soft value;
   determining, based on the first soft value, a tree pruning criterion and determining, for at least one bit of a transmit symbol, a second soft value using a tree search based on the tree pruning criterion.

15. The method according to claim 14, further comprising determining the transmit symbol based on the second soft value.

16. The method according to claim 14, wherein the first soft value is determined using linear MMSE estimation.

17. The method according to claim 14, wherein determining the tree pruning criterion includes determining a threshold and wherein the tree pruning criterion includes excludes all tree nodes having a metric above the threshold from the tree search.

18. The method according to claim 17, wherein the threshold is determined as the sum of a metric of an estimate of the transmit symbols and a predetermined value.

19. The method according to claim 18, further comprising:
    determining, for each transmit symbol, for at least one bit of the transmit symbol, a first soft value and determining the metric of an estimate of the transmit symbols based on the first soft value for the at least one bit of each transmit symbol.

20. The method according to claim 14, further comprising determining the bits associated with the transmit symbol based on the second soft value.

* * * * *